United States Patent
Läpple et al.

(10) Patent No.: US 11,732,168 B2
(45) Date of Patent: Aug. 22, 2023

(54) WATER-BASED ADHESIVE CONSISTING OF DISPERSED POLYMER AND EMULSIFIED SILICONE RESIN POLYMER

(71) Applicant: NOLAX AG, Sempach Station (CH)

(72) Inventors: Markus Läpple, Neuenkirch (CH); Claude Hosotte, Michelbach le Haut (FR); Barbara Niederberger, Unterägeri (CH)

(73) Assignee: NOLAX AG, Sempach Station (CH)

( * ) Notice: Subject to any disclaimer, the term of this patent is extended or adjusted under 35 U.S.C. 154(b) by 902 days.

(21) Appl. No.: 16/489,757

(22) PCT Filed: Mar. 2, 2018

(86) PCT No.: PCT/EP2018/055136
§ 371 (c)(1),
(2) Date: Aug. 29, 2019

(87) PCT Pub. No.: WO2018/158407
PCT Pub. Date: Sep. 7, 2018

(65) Prior Publication Data
US 2020/0115602 A1    Apr. 16, 2020

(30) Foreign Application Priority Data

Mar. 2, 2017 (EP) .................................... 17158993

(51) Int. Cl.
| | |
|---|---|
| *C09J 183/04* | (2006.01) |
| *B32B 5/02* | (2006.01) |
| *B32B 7/12* | (2006.01) |
| *B32B 15/14* | (2006.01) |
| *B32B 15/20* | (2006.01) |
| *B32B 37/12* | (2006.01) |
| *B32B 37/18* | (2006.01) |
| *C09J 5/00* | (2006.01) |
| *C09J 5/04* | (2006.01) |
| *C08G 77/00* | (2006.01) |

(52) U.S. Cl.
CPC .............. *C09J 183/04* (2013.01); *B32B 5/02* (2013.01); *B32B 7/12* (2013.01); *B32B 15/14* (2013.01); *B32B 15/20* (2013.01); *B32B 37/1284* (2013.01); *B32B 37/18* (2013.01); *C09J 5/00* (2013.01); *C09J 5/04* (2013.01); *B32B 2255/06* (2013.01); *B32B 2255/26* (2013.01); *B32B 2262/101* (2013.01); *B32B 2307/304* (2013.01); *B32B 2311/24* (2013.01); *B32B 2315/085* (2013.01); *C08G 77/80* (2013.01); *C09J 2423/04* (2013.01); *C09J 2425/00* (2013.01); *C09J 2433/00* (2013.01); *C09J 2475/00* (2013.01); *C09J 2483/00* (2013.01)

(58) Field of Classification Search
CPC ...... C09J 183/04; C09J 183/06; C09J 183/08; C08J 3/057; C08J 3/07
See application file for complete search history.

(56) References Cited

U.S. PATENT DOCUMENTS

| | | |
|---|---|---|
| 2009/0111931 A1 | 4/2009 | Pouchelon et al. |
| 2016/0009113 A1 | 1/2016 | Uetake |

FOREIGN PATENT DOCUMENTS

| | | | |
|---|---|---|---|
| JP | 3811220 B2 | 8/2006 | |
| WO | WO 03/029381 | * | 4/2003 |

OTHER PUBLICATIONS

Machine translation of CN 108913063 (no date).*
Machine translation of CN 107151547 (no date).*
Machine translation of JP 09-328672 (no date).*
Entry from Hawley's Condensed Chemical Dictionary, Sixteenth Edition 2016 John Wiley and Sons Inc, for the word "latex" on p. 814.*
International Search Report Corresponding to PCT/EP2018/055136 dated Mar. 29, 2018.
Written Opinion Corresponding to PCT/EP2018/055136 dated Mar. 29, 2018.

* cited by examiner

*Primary Examiner* — Marc S Zimmer
(74) *Attorney, Agent, or Firm* — Finch & Maloney PLLC

(57) ABSTRACT

A water-based adhesive which comprises a dispersed polymer and an emulsified silicone resin polymer. The adhesive is postcrosslinkable via reactive groups.

17 Claims, No Drawings

WATER-BASED ADHESIVE CONSISTING OF DISPERSED POLYMER AND EMULSIFIED SILICONE RESIN POLYMER

The invention relates to a water-based adhesive, to a method for bonding with such an adhesive, to an insulating material bonded with this adhesive, and to the use of a silicone resin polymer for such an adhesive, in accordance with the preambles of the independent claims.

For the lamination of insulating materials resistant to high temperature (e.g., glass fiber mat/aluminum foil) in the engine compartment or in exhaust systems, with long-term resistance above 350° C., there are only a limited selection of adhesives on the market. It is usual to use silicone adhesives, which either are 100% systems or are based on solvent. These silicone adhesives are usually two-component systems, which first are crosslinked and, after application, condense in the crosslinking channel. Systems of this kind can be used, however, only for service temperatures of around 180° C. to 210° C.

A problem today for modern engines is that they must be heated uniformly and rapidly, owing to the issues with $CO_2$ and $NO_x$. With transversely mounted engines, the turbocharger is usually located on the end wall side. The heat accumulates here, especially after the engine has been shut off. These hot/cold moments cause the greatest stress to the ancillary components. There may be instances of burst hoses, with the consequence of engine damage or of an engine/vehicle fire.

A one-component system is described in US 2009/0111931 A1 and consists of a silicone elastomer composition which is vulcanized at high temperatures. The ingredients of the adhesive include polyorganosiloxanes, and the adhesive has long-term stability at moderate temperatures. The disadvantage of such a composition, however, is that it has a high viscosity and is therefore unable to penetrate to a sufficient extent the fabric that is to be bonded. Generally speaking, the fabric must be pretreated accordingly. This can lead to higher costs for materials.

JP 3 811 220 B2 does describe a moisture-resistant adhesive which is water-based and comprises a dispersed polymer and an emulsified silicone resin polymer; compositions of this kind, known as latex, do not, however, exhibit heat resistance.

It is therefore an object of the invention to overcome the disadvantages of the prior art. The intention more particularly is to provide a water-based adhesive which adheres strongly at high temperatures, is not combustible, and is suitable for producing insulating materials which have to be resistant to high temperatures.

The invention relates to a water-based adhesive which comprises a dispersed polymer and an emulsified silicone resin polymer.

The polymer is dispersed in an aqueous phase. The silicone resin emulsion is preferably an aqueous methyl/phenyl-silicone resin emulsion (Me/Ph-Si resin), such as Silres® MPF 52 E, for example, from Wacker Chemie AG. "Water-based" means that the continuous phase is water.

Heat-sealable adhesives composed of 100% thermoplastic polymer, such as ethylene-acrylic acid (EAA) copolymer, for example, exhibit strong adhesion at room temperature and are suitable for bonding various substrates. Assemblies produced with an adhesive of this kind, however, lack sufficient heat resistance; the substrates part from one another when exposed substantially to heat.

Silicone resins on an aqueous basis, of the kind encountered in paints, for example, do not exhibit adhesive properties, but do have good heat resistance. It has now surprisingly been found that with a combination of a dispersed polymer and of an aqueous silicone resin polymer emulsion on an aqueous basis, the result is an adhesive which adheres well at high temperatures, is not combustible, is stable on storage, and is resistant to numerous solvents, oils, and acids. In particular, dispersed polymers which comprise copolymers with acrylate or acrylic acid exhibit good media resistance with respect to gasoline, diesel, engine oil, brake fluid, brake cleaner, and salt grit solutions.

The water-based adhesive may comprise solvent. The solvent content, however, ought not to exceed 6% by weight. A low solvent content first contributes to a low environmental impact, and improves occupational hygiene.

The adhesive is suitable for bonding various substrates such as, for example, metal or metal foils, especially aluminum, and glass fiber. Other substrates as well are conceivable: silicate fiber; polyamide fiber, e.g., kevlar or aramid; polyacrylonitrile fiber and/or carbon fiber. These materials may be bonded to one another in any combination.

Assemblies produced with an adhesive of the invention retain their original properties, such as flexibility, for example, even after drying. The adhesive does not cause any stiffening of the material.

The adhesive may take the form of a one-component system. The constituents may be premixed. The adhesive function may be obtained by activation—heating, for example.

An adhesive of this kind facilitates handling and simplifies the method for applying the adhesive. In comparison to two-component systems, moreover, there is a savings to be made in costs of materials. A bond between glass mat and aluminum foil by means of a two-component silicone adhesive, for example, requires the glass mat to be precoated, since otherwise the two-component system is unable sufficiently to penetrate the material.

A one-component system of the invention can be of low viscosity, wets the glass mat well, and requires no precoat. Accordingly, material can be saved.

The dispersed polymer is preferably a thermoplastic polymer.

The dispersed polymer may function as binder.

The thermoplastic polymer has the advantage that it positively influences the adhesive properties.

The thermoplastic polymer may have polar groups. The polar groups may be hydroxyl and/or carboxyl groups, for example.

The polar groups ensure the adhesion of the various substrates to be bonded, such as aluminum or glass, for example.

The thermoplastic polymer is preferably a copolymer or a combination of copolymers selected from the following group: acrylate copolymer, styrene-acrylate copolymer, ethylene-vinyl acetate copolymer, acrylate-urethane copolymer, polyurethane copolymer, ethylene-acrylic acid copolymer.

The desired properties can be controlled through the choice of the thermoplastic.

The silicone resin polymer is preferably a polysiloxane having organic side groups. Side groups are preferably selected from the following group: methyl-, phenyl-, hydroxy- and/or alkoxy-.

The silicone resin may consist of highly crosslinked polysiloxanes. The side groups may be methyl and/or phenyl groups. An advantage of using phenyl as a side group is that particularly high heat resistance can be achieved for the adhesive. Moreover, phenyl groups have relatively high compatibility with other resins and with fillers. The thermoplasticity is improved relative to pure methyl silicone resins. Other side groups on the siloxane main chain may be hydroxyl or alkoxy groups, for example, which lead to better curing at elevated temperature. In the course of the curing, there may be a condensation reaction both of polymer segments to one another and also to fillers, other resins or substrates.

In particular, the hydroxyl and alkoxy groups react together according to a condensation reaction, so leading to postcrosslinking of the silicone resin and hence to curing. The condensation reaction may be accelerated by addition of a tin-based catalyst, as for example dibutyltin dilaurate. The postcrosslinking takes place preferably with supply of heat, more preferably in a temperature range between 100 and 300° C., with particular preference between 120 and 250° C., and with very particular preference between 150 and 230° C. The crosslinking may also take place with organic polymers present in the formulation, with the consequence of a condensation reaction taking place between hydroxyl or alkoxy groups of the resin with hydroxyl or alkoxy groups of the polymer. Another possibility is for the crosslinking to take place between Si—H groups and vinyl groups which are present in the silicone resin. In this case the formulation may additionally be admixed with a platinum catalyst.

In the aforementioned temperature range between 100 and 300° C., with particular preference between 120 and 250° C., and with very particular preference between 150 and 230° C., moreover, there may be crosslinking of functional groups in the dispersed polymer with one another. This is the case especially when the dispersed polymers have free hydroxyl groups and/or free alkoxy groups and these groups enter into condensation reactions. Also conceivable, however, are other reactions via other functional groups of the dispersed polymer.

Crosslinking reactions of free functional groups on the silicone resin polymer are also possible. Moreover, crosslinking reactions between free functional groups on the silicone resin polymer, on the one hand, and on the dispersed polymer, on the other, are possible.

As a result of such postcrosslinking, especially postcrosslinking of the silicone resin, the heat resistance achieved by the adhesive and also by material bonded with this adhesive is particularly high.

The adhesive may comprise further constituents. For example, the composition may be admixed with further pigments and/or fillers for high-temperature performance, for viscosity adjustment, and improved coating.

The adhesive may also comprise thickeners, preferably inorganic, and more preferably finely divided silica, without any deterioration in the heat resistance by comparison with organic thickeners.

Further possible additives include neutralizing agents, dispersants, rheological assistants, defoaming agents, and biocide.

The adhesive may comprise a catalyst. A catalyst may accelerate the crosslinking of the individual components. More rapid crosslinking entails more rapid development of cohesion, i.e., an internal strength. As a result, an assembly of bonded substrates can be processed further at an earlier stage.

The solids content of the adhesive is preferably above 50% weight percent and more preferably between 60% and 80%.

An advantage of a high solids content in the case of aqueous systems is that more rapid drying is possible and/or less energy is required for drying. The solids content may be a result of the thermoplastic polymer, silicone resin polymer, fillers and/or insoluble additives. The solids content, however, ought not to be above 80%. Excessively high filler fractions and/or of insoluble additives have adverse consequences for the elongation at break of the film of adhesive.

The adhesive preferably has a pH of between 6 and 9.

The pH serves for the formulation and compatibility of the components. Furthermore, the pH of the adhesive ought to be selected such that the adhesive does not attack the materials to be bonded. Too high a pH, for example, could attack an aluminum foil to be bonded.

The adhesive may have a viscosity of 1000 to 50 000 mPa·s, preferably a viscosity of 5000 to 30 000 mPa·s, and very preferably a viscosity of 5000 to 15 000 mPa·s.

The figures for the viscosity were determined by the Brookfield method using a Brookfield DVI+. The measurements for the viscosity of 1000 to 50 000 mPa·s were performed at 23° C. with a spindle 4 at 20 rpm.

A further aspect of the invention relates to a method for bonding at least two different substrates with an adhesive as described above. The method comprises the following steps of:
  providing at least two substrates,
  applying the adhesive to at least a part of the first substrate and/or of the second substrate,
  joining and bonding the two substrates.

The adhesive may be applied both in the form of dots and continuously. The coat weight is preferably at least 70 g/m$^2$. Thereafter, the adhesive may be dried at a defined temperature between room temperature and 150° C., preferably 30° C. to 100° C., and more preferably 50° C. to 80° C. After drying, the adhesive may be activated. Activation here means that the adhesive properties are achieved, for example, by crosslinking of the components. The activation may take place at a temperature between 160° C. to 300° C., preferably 180° C. to 260° C., and more preferably at 210° C. to 240° C., with an activation time of 1 to 60 min, preferably 10 min to 30 min, and more preferably 20 min. The temperature and time for the activation are dependent on the composition and on the layer thickness at which the adhesive is used.

Storage after bonding and/or drying is likewise conceivable. The adhesive composition has latent reactivity. The bonded assembly made up of at least two substrates does not exhibit its ultimate properties until after the subsequent activation. In this case, the unactivated assembly is storable at room temperature for a defined time.

An advantage of the method is that different substrates can be durably assembled simply and inexpensively. The method steps can be simplified.

The adhesive may be applied by roller, stencil, knife or spraying.

The difference in mode of application has the advantage that the adhesive can be applied to various substrates and in accordance with the intended use.

One substrate may be a metal, preferably aluminum. The second substrate is preferably selected from the following group: glass fiber, silicate fiber, polyamide fiber, polyacrylonitrile fiber and/or carbon fiber.

The bonding of different substrates opens up access to a multiplicity of materials.

A further aspect of the invention relates to the use of a silicone resin polymer in a water-based adhesive. The adhesive comprises at least one polymer in dispersion in water, and is postcrosslinkable via reactive groups, more particularly via a condensation reaction.

The use of silicone resin polymer in an adhesive has the advantage that the adhesive withstands high temperatures and a broad field of application is available for such an adhesive.

A further aspect of the invention relates to an insulating material which is bonded with an adhesive as described above.

The insulating material may comprise at least two bonded substrates. A first substrate in that case is preferably a metal, more particularly aluminum, and a second substrate may be selected from the following group: glass fiber, silicate fiber, polyamide fiber, polyacrylonitrile fiber and/or carbon fiber.

The insulating material may be composed, for example, of an aluminum foil and a glass fiber mat. To produce the insulating material, the aluminum foil is coated with the water-based adhesive. The glass fiber mat can be placed on subsequently. On account of the lower viscosity of the adhesive by comparison with conventional 100 percent silicone resin, the adhesive is able to penetrate the glass fabric very well.

The insulating material has a high heat resistance and flexibility. Furthermore, a feature of the insulating materials is that they are not combustible.

Insulating materials using the above-described adhesive are especially suitable for components in the auto industry, especially for the engine and exhaust areas.

Components with such insulating materials may contribute substantially to driving safety. On the one hand, the nature of the materials gives the components a longer life than components used to date, and, on the other hand, by virtue of the advantageous properties of the materials, engine damage or spread of fires can be significantly restricted.

EXAMPLES

Various raw material compositions were tested for the preparation of the adhesive.

Table 1 lists the starting raw materials with the chemical characterization.

TABLE 1

| Designation | Chemical characterization | Trade name (manufacturer) |
|---|---|---|
| EAA (A)* | Heat-sealable adhesive based on aqueous ethylene-acrylic acid copolymer dispersion (EAA) | nolax S35.3110 (nolax AG) |
| Si resin (containing | Aqueous Me/Ph—Si resin emulsion (containing | Silres P 50 E (Wacker Silicone) |

TABLE 1-continued

| Designation | Chemical characterization | Trade name (manufacturer) |
|---|---|---|
| solvent) (B) | solvent, <8% xylene), 50% solids content | |
| Si resin (aqueous) (C) | Aqueous Me/Ph—Si resin emulsion, 50% solids content | Silres MPF 52 E (Wacker Silicone) |
| StyAc** (D) | Aqueous styrene-acrylate dispersion (StyAc) | Pliotec HDT 12 (OMNOVA Solutions) |
| PUD*** (E) | Aqueous polyurethane dispersion (PUD) | Neorez R-600 (DSM Coating Resins) |
| Filler (F) | Calcined kaolin | Kamin 70 (KaMin, LLC) |
| Defoamer (G) | Combination of liquid HCs, silicones, oxalkylated compounds, modified solids, and nonionic emulsifiers. | Agitan 701 (Münzing) |

*Ethylene-acrylic acid
**Styrene-acrylate
***Polyurethane dispersion
HCs hydrocarbons Table 2 shows an experiment matrix of the different compositions of the starting materials, with figures in percent by weight.

TABLE 2

(figures in % by weight)

| Formulation | 1 | 2 | 3 | 4 | 5 | 6 | 7* | 8 | 9 | 10* | 11 | 12 | 13* | 14* |
|---|---|---|---|---|---|---|---|---|---|---|---|---|---|---|
| A | 100 | 90.7 | | | | | 34.8 | | | | | | | 34.8 |
| B | | | 100 | 83.0 | | | | | | | | | | 52.2 |
| C | | | | | 100 | 82.6 | 52.2 | | | 52.2 | | | 65.2 | |
| D | | | | | | | | 100 | 86.9 | 34.8 | | | | |
| E | | | | | | | | | | | 100 | 90.9 | 21.7 | |
| F | | 9.4 | | 16.6 | | 16.5 | 13.0 | | 13.1 | 13.0 | | 7.6 | 13.0 | 13.0 |
| G | | | | 0.02 | | 0.02 | 0.02 | | 0.02 | 0.02 | | 0.02 | 0.02 | 0.02 |
| Thickener | | | | | | | 0.4 | | | | | 1.5 | | |
| Dispersant | | | | 0.4 | | | 0.5 | | | | | | | |

*inventive

Substrates

To produce the test specimen, substrates used were as follows:

isoGLAS filament fabric (Frenzelit) with a weight of 420 g/m²;

aluminum foil with a thickness of 30 μm for T-peel, and with a thickness of 20 μm for media resistance.

For comparison, specimens were used of an assembly composed of Isoglas glass fiber fabric with 20 μm aluminum foil and 100% silicone adhesive. In the results tables below, this assembly is designated the benchmark (BM).

Production of the Test Specimen 2 pieces approximately 10 cm×12 cm in size were cut to size. The aluminum foil was cut to size in 2 pieces of approximately 13 cm×20 cm.

Bonding:

The formula under test was coated onto the matt side of the aluminum foil using a wire-wound coating bar, generally RDS 44, without pressure. The coat weight was around 70 g/m². A piece of glass fiber fabric was placed lengthwise (with the reverse side downward) directly into the film while still wet; it should be ensured that approximately 2 cm of the upper margin are not in the adhesive—this makes it easier later to clamp the specimen into the tensile testing machine. The glass fabric was pressed on uniformly by hand. The test specimen was subsequently dried in an oven at 50° C. for around 20 minutes.

Activation at 230° C.:

Directly after drying, the test specimens were activated in a muffle furnace at 230° C. for 1 to 20 min. The test specimens were always placed into the oven with the aluminum side downward. Where possible, the adhesive strip marking ought to be removed prior to activation. The activation is necessary in order to bring about crosslinking of the adhesive system.

Adhesive Before and after Heat Exposure at 90° C. (T-Peel)

The T-peel test was carried out in a heating chamber at 90° C. The sample mount for the heating chamber had a spacing of 3 cm between the lower and upper jaws. The measurement length of the sample was 70 mm, the relative velocity of the jaws was 50 mm/min, and a maximum force was 100 N. Before being clamped in, the test specimens were conditioned at 90° C. for 15 minutes and subsequently at 90° C. for 2 minutes after having been clamped in. Thereafter the test specimens were exposed to a heat load of 400° C. over a period of 1 h.

Table 3 summarizes the test results for the individual formulations from table 2.

TABLE 3

| Formulation | Adhesive value before heat exposure | | Adhesive value after heat exposure, 1 h at 400° C. | |
|---|---|---|---|---|
| | Average load (N/2 cm) | Maximum load (N/2 cm) | Average load (N/2 cm) | Maximum load (N/2 cm) |
| 1 | 0.75 | 1.29 | 0.52 | 1.15 |
| 2 | 0.68 | 1.25 | 0.82 | 1.55 |
| 3 | <0.1 | <0.1 | <0.1 | <0.1 |
| 4 | <0.1 | <0.1 | <0.1 | <0.1 |
| 5 | <0.1 | <0.1 | <0.1 | <0.1 |
| 6 | <0.1 | <0.1 | <0.1 | <0.1 |
| 7* | 4.37 | 5.84 | 1.58 | 2.12 |
| 8 | 8.39 | 10.21 | <0.1 | <0.1 |
| 9 | 8.04 | 9.57 | <0.1 | <0.1 |
| 10* | 3.19 | 4.13 | 0.52 | 1.03 |
| 11 | 6.35 | 9.00 | <0.1 | <0.1 |
| 12 | 6.58 | 9.11 | <0.1 | <0.1 |
| 13* | 2.6 | 3.75 | 0.85 | 1.32 |
| 14* | 2.07 | 3.26 | 1.33 | 2.07 |
| BM | Assembly not separable | | <0.1 | <0.1 |

*inventive

The pure aqueous silicone resin emulsions (formulations 3 and 5) exhibit poor filming and adhesive properties.

The EAA adhesive (formulations 1 and 2) holds the two materials of the test specimen together, but loses adhesion after storage at elevated temperature.

The inventive adhesive (formulation 7), based on formulation 1 and an aqueous silicone resin emulsion, exhibits higher adhesion values for the test specimen after heat exposure (1 h, 400° C.) than the individual substances (formulation 1, 3, 5).

With the inventive adhesive composed of a styrene-acrylate copolymer and a silicone resin emulsion (formulation 10), as well, the assembly still holds together after heat exposure, whereas the individual substances (formulations 6, 8, 9) do not hold.

An aqueous inventive polyurethane dispersion with silicone resin in accordance with formulation 13 likewise exhibits improved adhesion values relative to the individual constituents (formulations 11 and 12) and especially relative to the benchmark.

While formulations 8 and 9 and also 11 and 12 exhibit good adhesion values prior to heat exposure, they do not withstand heat exposure.

Heat Resistance to Infrared Heater

To test the heat resistance, the test specimen was cut to a size of 25×25 cm. The test specimen was sprayed with a heat-resistant varnish (exhaust varnish) in the middle over a size of around 2.5×2.5 cm. The test specimen was placed on a rack. At a distance of 20 mm from the rack and from the piece of test specimen provided with heat-resistant varnish, an infrared source was located. The infrared heater used was a Krelus IR heater. The test specimen was irradiated at a temperature of 459° C. for 2 h.

Table 4 summarizes the results of the testing of the heat resistance using an infrared heater.

TABLE 4

| Formulation | Assessment |
|---|---|
| 1 | delaminated after just 5 min |
| 2 | no self-delamination after 2 h at 459° C. |
| 7* | no self-delamination after 2 h at 459° C. |
| 10* | no self-delamination after 2 h at 459° C. |
| 13* | no self-delamination after 2 h at 459° C. |
| 14* | no self-delamination after 2 h at 459° C. |
| BM | delaminated after 10 min |

*inventive

Since the test specimens with an aqueous silicone resin emulsion (formulations 3 and 6) according to table 3 already failed to exhibit any adhesive strength under heat, it was not possible to test the heat resistance of the corresponding test specimen. The test specimens with formulations 8 and 9 and also the shaped articles comprising polyurethane dispersions (formulations 11 and 12, table 3) are also not heat-resistant.

The test specimen with an EAA adhesive (formulation 1) delaminates after just 5 min, and therefore has only very little or no heat resistance.

The test specimens with the inventive adhesive (formulations 7, 10, and 13) did not exhibit self-delamination even after 2 h at 459° C. Delamination or self-delamination here means that the individual substrates of the test specimen part from one another.

A test specimen with the inventive adhesive 14 additionally comprises solvent. A test specimen of this kind likewise exhibits no self-delamination. In the dried and activated state, formulation 14 is substantially free of solvent. However, the presence of traces of the solvent in the ppm range cannot be ruled out.

Heat Resistance to Thermal Oven

The respective test specimen was stored freely standing on a rack in a high-temperature oven at 400° C. for 1 h.

Table 5 shows the results from the heat exposure in the thermal oven.

TABLE 5

| Formulation | Assessment |
|---|---|
| 1 | no delamination |
| 2 | no delamination |
| 7* | no delamination |
| 8 | delaminated after 5 min |
| 9 | delaminated after 5 min |
| 10* | no delamination |

TABLE 5-continued

| Formulation | Assessment |
|---|---|
| 11 | delaminated after 5 min |
| 12 | delaminated after 5 min |
| 13* | no delamination |
| 14* | no delamination |
| BM | delaminated after 10 min |

*inventive

Test specimens with the inventive adhesives (formulations 7, 10, 13, 14) do not exhibit any delamination in the thermal oven either.

Combustion Test

The combustion test was carried out with a BBW kiln from Wazau, Berlin.

The test specimen was cut to a size of 560 mm×160 mm and affixed to a support. The Bunsen burner was ignited and allowed to burn for at least 2 min before the start of the test. The burner was subsequently held at an angle of 30° to the test specimen, at a distance of 2 cm. The test specimen was subjected to the flame for 5 seconds horizontally (ignition test) and 15 seconds horizontally (combustibility test).

The results of the combustion test for the test specimens with the individual formulations are set out in table 6.

TABLE 6

| Designation | Ignition test/combustibility test |
|---|---|
| 1 | +/+ |
| 2 | +/+ |
| 3 | −/− (coated only on aluminum; no assembly tested) |
| 4 | −/− (coated only on aluminum; no assembly tested) |
| 5 | −/− (coated only on aluminum; no assembly tested) |
| 6 | −/− (coated only on aluminum; no assembly tested) |
| 7* | −/− |
| 8 | was not tested, since not heat-resistant |
| 9 | was not tested, since not heat-resistant |
| 10* | −/− |
| 11 | was not tested, since not heat-resistant |
| 12 | was not tested, since not heat-resistant |
| 13* | −/− |
| 14* | −/− |
| BM | +/+ |

*inventive
− does not ignite/does not burn
+ ignites/forms flame

The test specimen with the pure binder (formulation 1) is not fire-resistant. Conversely, the test specimens with the inventive adhesive (formulation 7, 10, and 13) are fire-resistant.

Good results were also achieved with an adhesive which before drying and activation contained solvent (5.75% wet/wet, formulation 14).

The invention claimed is:

1. A water-based adhesive comprising:
   a dispersed thermoplastic polymer, and
   an emulsified silicone resin polymer,
   wherein the adhesive is postcrosslinkable via reactive groups at temperatures between 100° C. and 300° C.,
   wherein a solids content is above 50% by weight.

2. The adhesive according to claim 1, wherein the adhesive is a one-component system.

3. The adhesive according to claim 1, wherein the thermoplastic polymer has polar groups.

4. The adhesive according to claim 1, wherein the silicone resin polymer is a polysiloxane having organic side groups.

5. The adhesive according to claim 1, wherein the adhesive has a pH of between 6 and 9.

6. The adhesive according to claim 1, wherein the adhesive has a viscosity of between 4, 190.883 to 120,954.416 lb/ft·h (1,000 to 50,000 mPa·s).

7. A method for bonding at least two different substrates with an adhesive according to claim 1, comprising the steps of:
   providing at least two substrates,
   applying the adhesive to at least a part of the first substrate and/or of the second substrate, and
   joining and bonding the two substrates together.

8. The method according to claim 7, wherein the adhesive is applied by a roller, a stencil, a knife or spraying.

9. The method according to claim 7, wherein the first substrate is a metal and the second substrate is selected from the group consisting of glass fiber, silicate fiber, polyamide fiber, polyacrylonitrile fiber, carbon fiber, and any combination thereof.

10. An insulating material bonded with an adhesive according to claim 1.

11. The insulating material according to claim 10, wherein the insulating material comprises at least two bonded substrates, a first substrate being a metal and a second substrate being selected from the group consisting of glass fiber, silicate fiber, polyamide fiber, polyacrylonitrile fiber, carbon fiber, and any combination thereof.

12. The adhesive according to claim 1, wherein the adhesive is postcrosslinkable via a condensation reaction.

13. The adhesive according to claim 1, wherein the thermoplastic polymer is a copolymer or a combination of copolymers selected from the group consisting of acrylate copolymer, styrene-acrylate copolymer, ethylene-vinyl acetate copolymer, acrylate-urethane copolymer, polyurethane copolymer, and ethylene-acrylic acid copolymer.

14. The adhesive according to claim 4, wherein the organic side groups are selected from the group consisting of methyl, phenyl, alkoxy, and any combination thereof.

15. The adhesive according to claim 1, wherein the solids content is between 60% and 80% by weight.

16. The method according to claim 9, wherein the metal is aluminum.

17. The insulating material according to claim 11, wherein the metal is aluminum.

\* \* \* \* \*